DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 712

T869,005
MONOAZO COMPOUNDS AND CATIONS THEREOF

Raymond C. Harris, P.O. Box 511, Kingsport, Tenn. 37662

Filed Mar. 29, 1968, Ser. No. 717,417
Int. Cl. C09b *29/36*
U.S. Cl. 260—152
No Drawing. 32 Pages Specification

Azo compounds and cations, which produce bright yellow to reddish-yellow dyeings on acrylic, modacrylic and acid-modified polyester, have the general formula

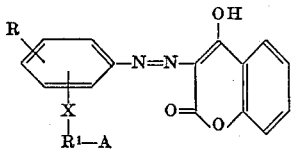

wherein A is hydrogen, alkyl, alkoxy, halogen, cyano, nitro or alkylsulfonyl; X is $—SO_2NH—$, —NHCO—, —CO—, —COO—, or —CONH—; $R^1$ is alkylene; and A is a tertiary or quaternary amino group. Preferred compounds are those in which R is hydrogen, alkyl, alkoxy, or halogen ortho to the azo group; $—X—R^1—$ is $$—COH_2—,\ —COCH_2CH_2—,\ —COOCH_2CH_2—$$
$$—COOCH_2CH_2CH_2—,\ \text{or}\ —NHCOCH_2—$$

positioned para to the azo group; and A is morpholino, piperidino, dimethylamino, trimethylammonium, diethylamino, or triethylammonium.